(12) United States Patent
Campbell et al.

(10) Patent No.: US 9,774,662 B2
(45) Date of Patent: *Sep. 26, 2017

(54) MANAGING TRANSACTIONAL DATA FOR HIGH USE DATABASES

(71) Applicant: International Business Machines Corporation, Armonk, NY (US)

(72) Inventors: John J. Campbell, Alton (GB); Daniel Kozin, Santa Clara, CA (US); Nigel G. Slinger, Los Gatos, CA (US); John B. Tobler, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/492,933

(22) Filed: Sep. 22, 2014

(65) Prior Publication Data

US 2015/0039578 A1 Feb. 5, 2015

Related U.S. Application Data

(63) Continuation of application No. 13/954,423, filed on Jul. 30, 2013.

(51) Int. Cl.
*G06F 7/00* (2006.01)
*G06F 17/00* (2006.01)
(Continued)

(52) U.S. Cl.
CPC .......... *H04L 67/10* (2013.01); *G06F 11/3082* (2013.01); *G06F 17/30306* (2013.01); *G06F 11/3409* (2013.01); *G06F 2201/87* (2013.01)

(58) Field of Classification Search
CPC ........... G06Q 30/0269; G06Q 30/0255; G06Q 30/0241; G06Q 30/0251; G06Q 30/0261
(Continued)

(56) References Cited

U.S. PATENT DOCUMENTS 6,049,797 A * 4/2000 Guha ................ G06F 17/30598
6,289,354 B1 * 9/2001 Aggarwal ......... G06F 17/30327
(Continued)

OTHER PUBLICATIONS

IP.com et al., "Using Information Content Ratio To Determine Aggregation Level quality for Multidimensional Cube Data", Feb. 11, 2009, pp. 1-12.

*Primary Examiner* — Hosain Alam
*Assistant Examiner* — Nicholas Allen
(74) *Attorney, Agent, or Firm* — Erik K. Johnson; SVL IPLaw Edell Shapiro & Finnan, LLC

(57) ABSTRACT

According to one embodiment of the present invention, a system compares database transactions to corresponding performance information to identify conforming database transactions with an acceptable deviation from the performance information and outlier database transactions beyond the acceptable deviation from the performance information. The system aggregates information from a threshold quantity of conforming database transactions into an aggregated record, wherein the threshold quantity is dynamically adjusted, and generates a record for each outlier database transaction, wherein conditions for identifying the outlier database transactions are dynamically adjusted. Embodiments of the present invention further include a method and computer program product for managing database transactions in substantially the same manners described above.

7 Claims, 7 Drawing Sheets

(51) Int. Cl.
  *H04L 29/08* (2006.01)
  *G06F 17/30* (2006.01)
  *G06F 11/30* (2006.01)
  *G06F 11/34* (2006.01)

(58) Field of Classification Search
  USPC .......................................................... 707/703
  See application file for complete search history.

(56) References Cited

U.S. PATENT DOCUMENTS

| | | | |
|---|---|---|---|
| 6,873,979 B2 | 3/2005 | Fishman et al. | |
| 7,149,736 B2 | 12/2006 | Chkodrov et al. | |
| 7,769,679 B2 | 8/2010 | Skuriat et al. | |
| 8,015,267 B2 | 9/2011 | Patel | |
| 8,015,276 B2 | 9/2011 | Hoeflin et al. | |
| 8,015,454 B1* | 9/2011 | Harrison | G06F 11/3409 714/47.3 |
| 8,086,528 B2 | 12/2011 | Barrett et al. | |
| 8,347,148 B1 | 1/2013 | Harrison et al. | |
| 2008/0077515 A1* | 3/2008 | Zoldi | G06Q 40/00 705/35 |
| 2008/0235075 A1 | 9/2008 | Couture | |
| 2009/0018996 A1* | 1/2009 | Hunt | G06Q 30/02 |
| 2009/0086741 A1* | 4/2009 | Zhang | H04L 41/5009 370/401 |
| 2010/0083147 A1 | 4/2010 | Gaffney | |
| 2010/0125534 A1* | 5/2010 | Brandes | G06Q 10/04 705/36 R |
| 2011/0264612 A1* | 10/2011 | Ryman-Tubb | G06Q 20/4016 706/12 |
| 2011/0282790 A1 | 11/2011 | Bennett et al. | |
| 2011/0314145 A1* | 12/2011 | Raleigh | H04L 41/0893 709/224 |
| 2012/0109705 A1* | 5/2012 | Belady | G06Q 10/06312 705/7.22 |
| 2012/0131172 A1 | 5/2012 | Falk | |
| 2012/0131591 A1 | 5/2012 | Moorthi | |
| 2012/0203788 A1 | 8/2012 | Magyar et al. | |
| 2012/0219511 A1* | 8/2012 | Petropavlov | A61K 8/64 424/49 |
| 2012/0254242 A1* | 10/2012 | Kanagasabapathi | G06Q 30/0201 707/776 |
| 2012/0259793 A1 | 10/2012 | Umansky | |
| 2012/0317276 A1* | 12/2012 | Muniraju | H04L 41/14 709/224 |
| 2013/0007750 A1 | 1/2013 | Beckerle et al. | |
| 2013/0019008 A1 | 1/2013 | Jorgenson | |
| 2013/0024364 A1 | 1/2013 | Shrivastava | |
| 2013/0031044 A1* | 1/2013 | Miranda | G06N 5/025 706/47 |
| 2013/0073586 A1 | 3/2013 | Aubry | |
| 2013/0086235 A1 | 4/2013 | Ferris | |
| 2013/0097304 A1 | 4/2013 | Asthana | |
| 2013/0103215 A1 | 4/2013 | Dai | |
| 2013/0124263 A1* | 5/2013 | Amaro | G06Q 30/02 705/7.34 |
| 2013/0124669 A1 | 5/2013 | Anderson | |
| 2013/0139152 A1 | 5/2013 | Chang | |
| 2013/0152047 A1* | 6/2013 | Moorthi | G06F 11/368 717/124 |
| 2013/0158950 A1* | 6/2013 | Cohen | G06F 17/00 702/176 |
| 2015/0039576 A1* | 2/2015 | Campbell | G06F 11/30 707/703 |

\* cited by examiner

US 9,774,662 B2

MANAGING TRANSACTIONAL DATA FOR HIGH USE DATABASES

CROSS-REFERENCE TO RELATED APPLICATIONS

This application is a continuation of U.S. patent application Ser. No. 13/954,423, entitled "MANAGING TRANSACTIONAL DATA FOR HIGH USE DATABASES" and filed Jul. 30, 2013, the disclosure of which is incorporated herein by reference in its entirety.

BACKGROUND

1. Technical Field

Present invention embodiments relate to managing information about database transactions, and more specifically, to dynamically controlling overhead and volume associated with collecting transactional performance and accounting data.

2. Discussion of the Related Art

In a multi-tenant cloud computing environment, database management systems handle high transaction rates and collect corresponding transactional performance and accounting data. Collecting and maintaining this data facilitates charge-back and problem analysis according to each tenant's service level agreement (SLA) with the cloud system provider. However, if the processing or disk space costs of collecting the data are too great, the transactional throughput rate may be impeded and/or information about the transactions may have to be discarded.

BRIEF SUMMARY

According to one embodiment of the present invention, a system compares database transactions to corresponding performance information to identify conforming database transactions with an acceptable deviation from the performance information and outlier database transactions beyond the acceptable deviation from the performance information. The system aggregates information from a threshold quantity of conforming database transactions into an aggregated record, and generates a record for each outlier database transaction, wherein conditions for identifying the outlier database transactions are dynamically adjusted. Embodiments of the present invention further include a method and computer program product for managing database transactions in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
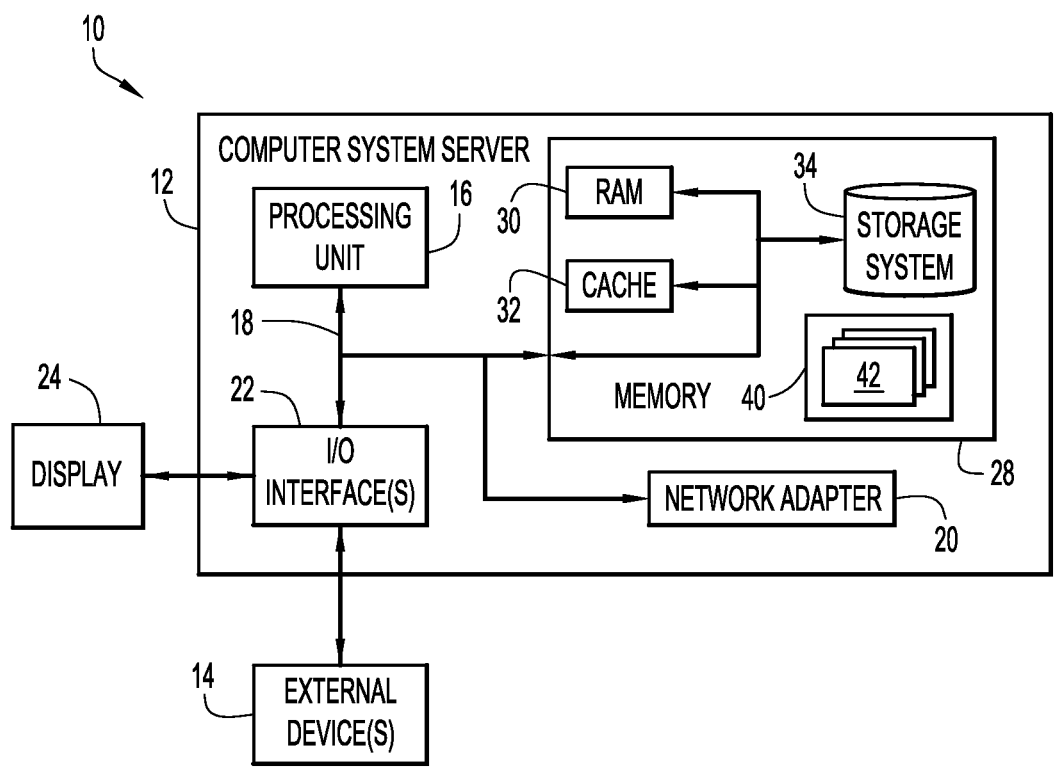
FIG. 1 depicts a cloud computing node according to an embodiment of the present invention.

Present invention embodiments relate to managing information about database transactions. In an example scenario, a database management system in a cloud computing environment controls collection of transactional data (e.g., accounting and performance information about the transaction). The system aggregates transactional data for a number of similar transactions having typical performance characteristics, and writes an individual record for each transaction having atypical performance characteristics. Criteria defining a typical transaction are dynamically adjusted based on, e.g., the statistics for performance metrics over a preceding time period.

One aspect of a present invention embodiment is to aggregate transaction data for ordinary transactions to reduce processing and disk overhead. For example, aggregating x number of records into a single record based on tenant ID and other transactional qualifiers reduces the volume of records and the processing cost of record externalization by a factor of about x. Another aspect is to write individual records for atypical transactions to facilitate problem analysis. Still another aspect is to dynamically adjust the definition of atypical transactions (also referred to as outlier transactions or outliers) as the database environment changes (e.g., additional tenants are added to the system, hardware changes, etc.). A further aspect is to eliminate the need for users to identify thresholds defining outlier transactions, which may be difficult for many users and may be limited to systems with static performance characteristics.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The cloud model Service Models may include the following:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include an of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
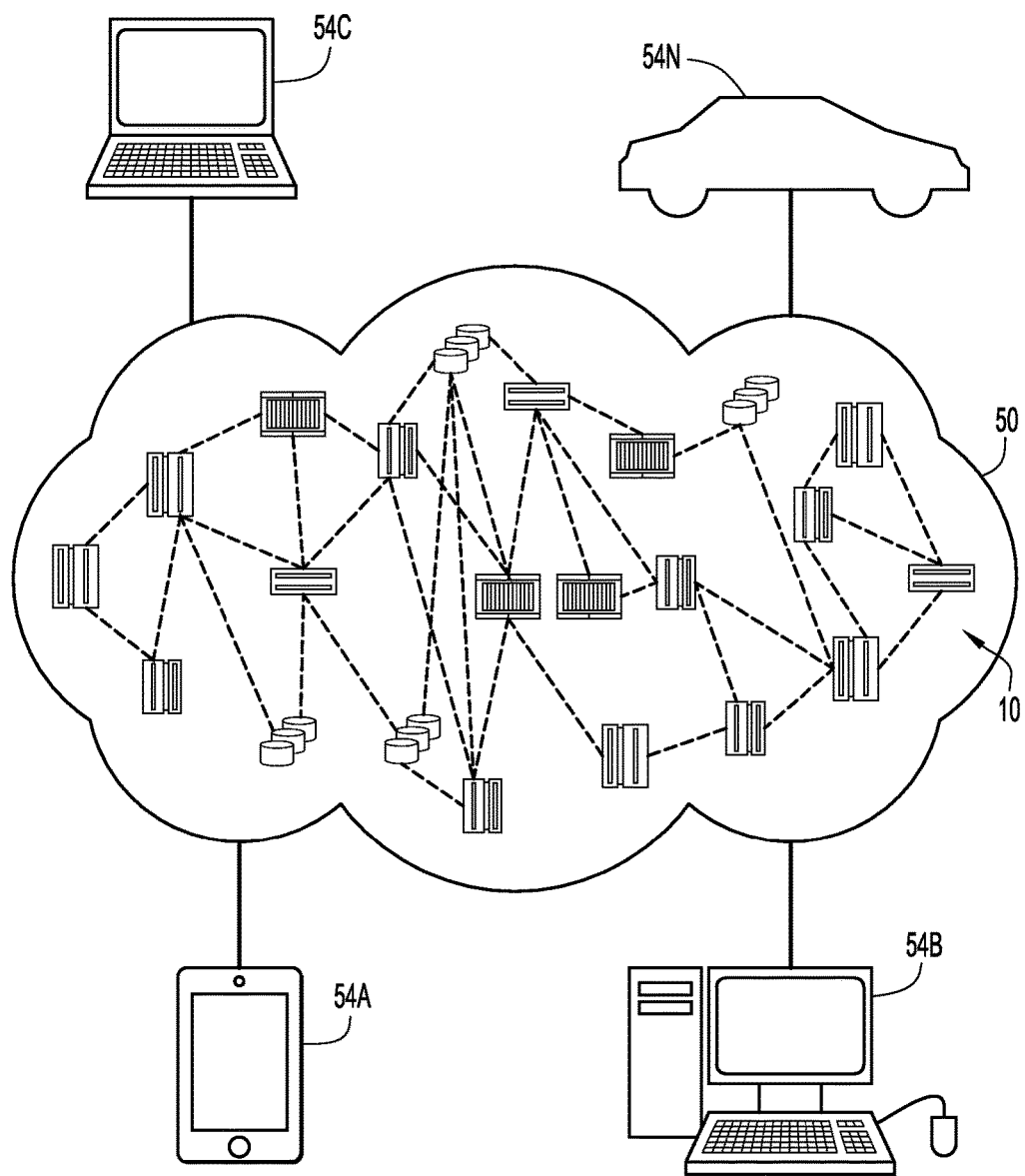
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers (such as, for example, personal digital assistant (PDA) or cellular telephone 54A, desktop computer 54B, laptop computer 54C, and/or automobile computer system 54N) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
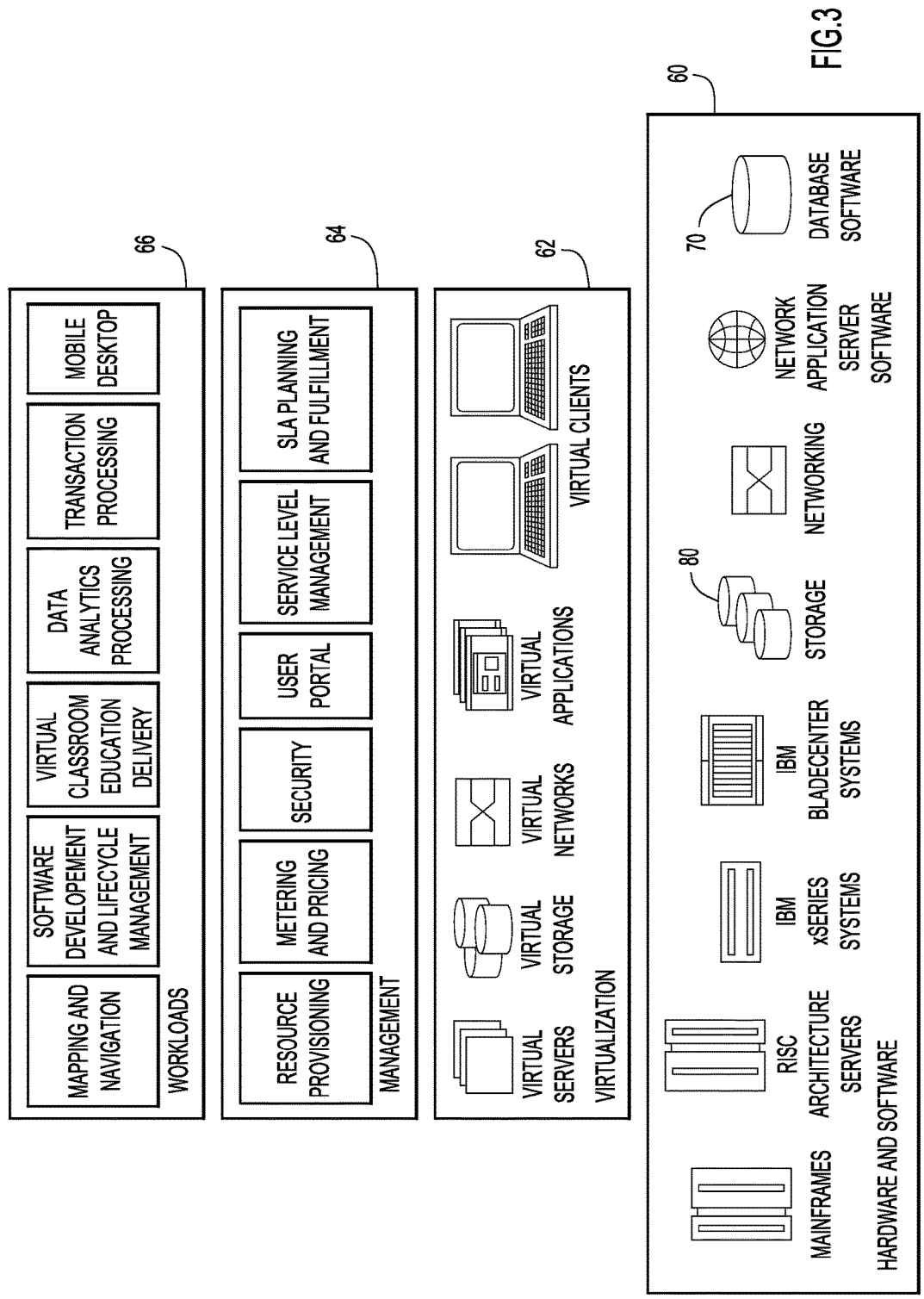
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 80; networks and networking components. Examples of software components include network application server software, in one example IBM WebSphere® application server software; and database software 70, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices accessing the cloud computing services.

Figure 4:
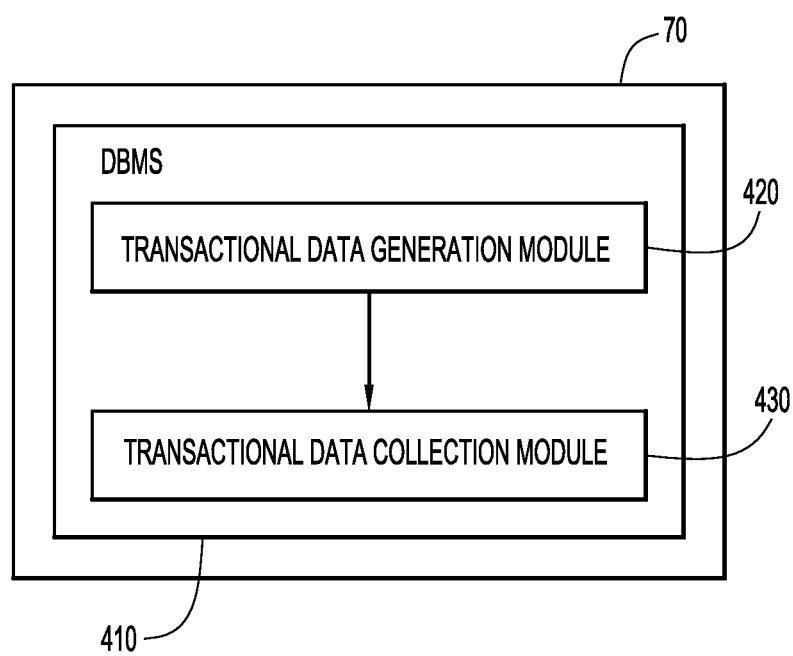
FIG. 4 is a block diagram of database modules according to an embodiment of the present invention.

A block diagram of database modules 70 according to an embodiment of the present invention is illustrated in FIG. 4. The database modules may include a database management system 410 to manage and execute transactions against one or more databases on behalf of tenants and workloads 66 of cloud system 50. The database management system may include a transactional data generation module 420 and a collection module 430.

Transactional data generation module 420 provides information (e.g., tenant, workload, response time, etc.) about transactions executed by the database management system to collection module 430. Database management system 410 and transactional data generation module 420 may be implemented by any conventional or other database and transactional accounting software. For example, each thread running in the database may run in a tenant context defined by the cloud provider, from which the transactional data generation module may determine detailed environment information about the transaction (e.g., tenant identifier, workload identifier, end user identifier, IP address of the system initiating the transaction, transaction name, resource usage, etc). In one embodiment of the present invention, the thread processing a transaction gathers data as the transaction executes (e.g., how long the thread waits for I/O, how much processor time it consumes executing database code, etc.), and the thread passes the gathered data directly or indirectly (e.g., via transactional data generation module 420) to collection module 430 when the transaction completes.

Collection module 430 may include one or more modules or units to perform the various functions of present invention embodiments described below (e.g., acquiring transaction performance statistics, associating transactional data records with aggregation keys, determining performance outliers, aggregating transactional data records, externalizing transactional data records, etc.), may be implemented by any combination of any quantity of software and/or hardware modules or units, and may reside within one or more units 41 of program 40 and memory 28 of a server system and/or client systems for execution by processing unit 16.

Figure 5:
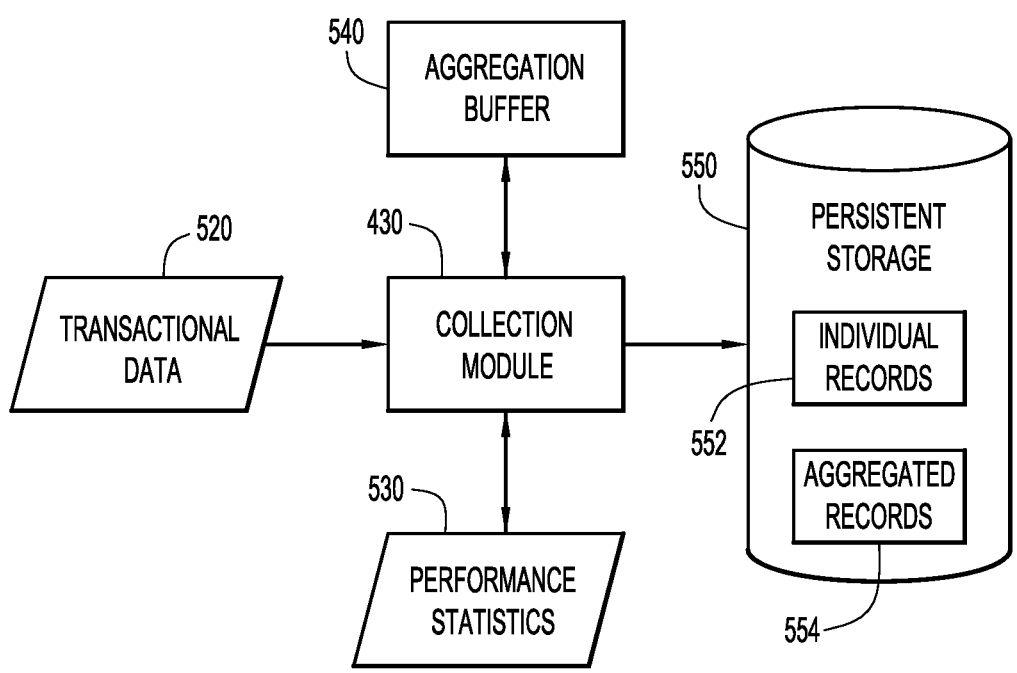
FIG. 5 is a block diagram of data flow to and from a collection module for transactional data according to an embodiment of the present invention.

A block diagram of data flow to and from collection module 430 according to an embodiment of the present invention is illustrated in FIG. 5. Collection module 430 receives transactional data 520 (e.g., from transactional data generation module 420) and accesses performance statistics 530. Each transaction may be associated with a key based on a combination of one or more elements of the transactional data (e.g., tenant identifier, workload identifier, etc.).

Separate performance statistics may be kept for transactions corresponding to each key value. Examples of performance attributes may include total transactional elapsed time and/or other resource usage (e.g., total transactional processor time, total elapsed time while executing in the database, total processor time while executing in the database, etc.). The statistics for the performance attributes may include averages and deviations, sample data, and other statistics by which outlier transactions may be identified.

For a given transaction, collection module 430 either accumulates the transactional data in an aggregate record stored by key in aggregation buffer 540 or writes a (non-aggregated) individual record 552 of the transactional data to persistent storage 550, based on a comparison of the transactional data to performance statistics 430 as discussed below. Collection module 430 writes aggregated records 554 to persistent storage 550 from aggregation buffer 540 when aggregation limits are reached.

Figure 6:
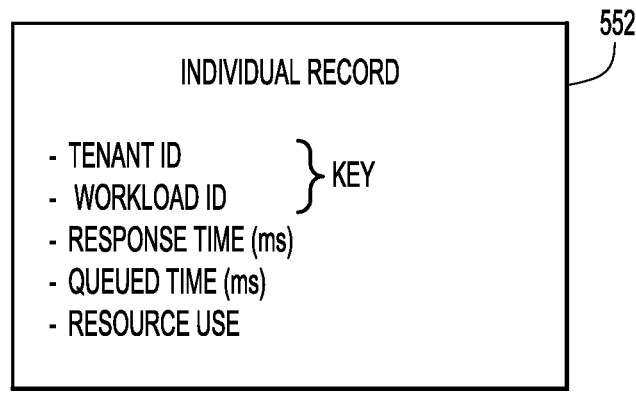
FIG. 6 is a list of content for an example individual record for transactional data according to an embodiment of the present invention.

Example information about a transaction that may be contained or encoded in an individual record 552 according to an embodiment of the present invention is shown in FIG. 6. The information may include, e.g., tenant identifier, workload identifier, response time, queued time, various resource use metrics, etc. Response time is the time elapsed from when the transaction was initiated to when it completed. Queued time is the time elapsed from when the transaction was initiated to when it began executing. Response and queued times may be measured in any units (e.g., milliseconds). Resource use may include any combination of resource usage metrics (e.g., processor time used, logical reads, physical reads, volume of data read or written, etc.).

Figure 7:
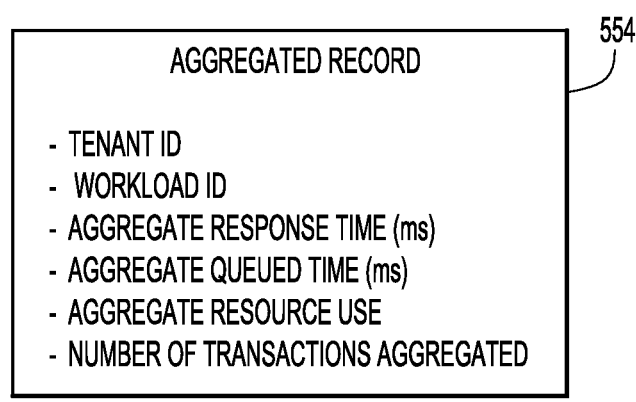
FIG. 7 is a list of content for an example aggregated record for transactional data according to an embodiment of the present invention.

Example information that may be contained or encoded in aggregated record 554 according to an embodiment of the present invention is shown in FIG. 7. An aggregated record may include, e.g., tenant identifier, workload identifier, aggregate response time, aggregate queued time, aggregate resource use, number of transactions aggregated, data/time of the first record aggregated, etc.

Figure 8:
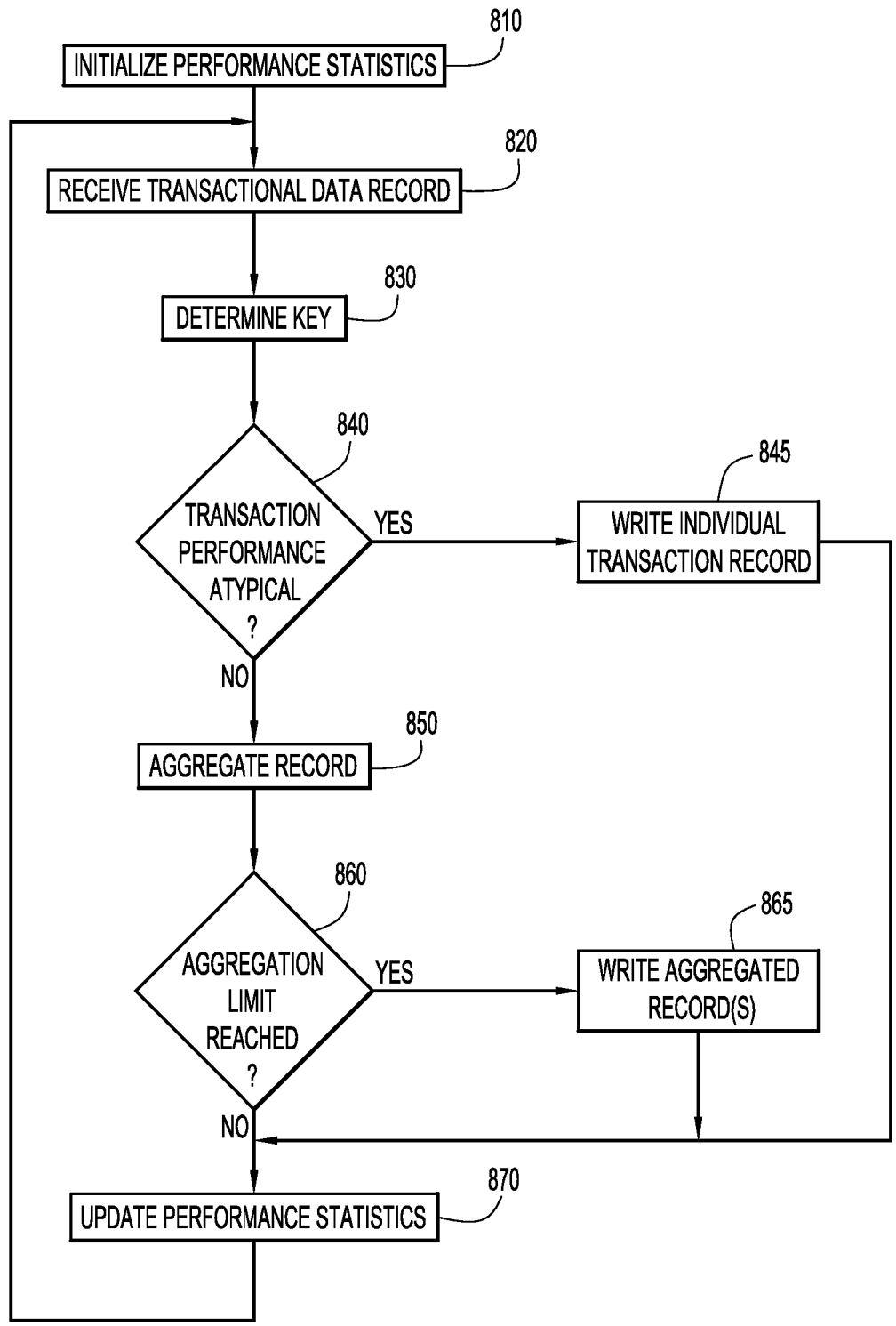
FIG. 8 is a flow diagram illustrating a manner of collecting transactional data according to an embodiment of the present invention.

A manner in which collection module 430 may manage the collection and externalization of transactional data according to an embodiment of the present invention is illustrated in FIG. 8. In particular, at step 810 the collection module loads initial performance statistics into memory (e.g., from storage system 34, storage 80, or other source). At step 820, the collection module receives transactional data for a transaction (e.g., from transactional data generator module 420). At step 830, the collection module determines the key for the transaction based on the transactional data.

At step 840, the collection module determines whether the transaction performance is atypical by comparing the transaction performance to the performance statistics associated with the key. For example, the collection module may determine that a transaction is atypical if the completion time is more than a predetermined number of standard deviations (e.g., 3, 2, 4, etc.) greater than the mean. The number of deviations needed to identify an outlier transaction may be controlled by a configuration parameter. In addition, a configuration parameter may control the performance metrics used for outlier identification (e.g., to make the comparison based on processor usage only, elapsed time only, etc.). Any manner of comparison based on any performance metric or metrics may be used to identify transactions with performance significantly worse than usual transactions (e.g., any type of deviation statistic, any type of statistical test, etc.).

If the transaction is determined to be atypical, the collection module externalizes (e.g., writes to a file in persistent storage 550, enters into a database, sends to an application, etc.) an individual, non-aggregated record for the transaction at step 845, and processing proceeds to step 870. Otherwise, at step 850, the collection module adds the transactional data to an aggregate record that is associated with the key and cached in memory in aggregation buffer 540.

At step 860, the collection module determines whether an aggregation limit has been reached. For example, the aggregation limit may be a predetermined threshold on the number of transactions to aggregate (e.g., 10, 100, etc.). If the number of transactions aggregated under the key exceeds the threshold, the aggregated record is externalized at step 865 (e.g., written to a file in persistent storage 550, entered into a database, sent to an application, etc.). The threshold number of transactions may be a configuration parameter that can be changed occasionally. The threshold may be many transactions in order to reduce processor and disk usage in externalizing records. To further control storage costs, the collection module may compress aggregate and/or individual records before writing them to disk, although this may incur a corresponding processing overhead.

At step 870, the collection module updates the performance statistics associated with the key. For example, averages may be computed by keeping an aggregated total of each performance metric and the number of transactions contributing to the total. Deviations may be estimated in any manner. For example, a sample standard deviation may be maintained (e.g., keeping complete data for a random subset of transactions). Alternatively an aggregated total of the square of each performance metric may be kept for estimating the standard deviation. Alternatively, the difference of each transaction with respect to the current average may be maintained; this provides an inexpensive way to identify the average deviation of transactions.

The performance statistics and related data (e.g., sample data) for each aggregation key may be kept for a longer duration than the aggregated transactional data. This ensures that the performance statistics include many transactions and increases the reliability of outlier identification. However, there may be conditions under which performance data should be flushed from its cache. For example, an internal storage threshold may be reached for performance storage blocks, and the least recently used blocks may be freed as a result. The collection module may write the performance data to disk upon such a condition.

It will be appreciated that the embodiments described above and illustrated in the drawings represent only a few of the many ways of implementing embodiments for dynamically controlling overhead and volume associated with collecting transactional performance and accounting data.

The topology or environment of the present invention embodiments may include any number of computer or other processing systems, data storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., database software, communications software, DBMS, transactional data generation module, collection module, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for dynamically controlling overhead and volume associated with collecting transactional performance and accounting data in traditional as well as cloud environments for any types of transactions (e.g., database transactions, web or other application use, processor use, network I/O use, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart, illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/arts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of managing database transactions comprising:
   receiving transaction information associated with a database transaction;
   comparing the transaction information associated with the database transaction to corresponding performance information to determine whether the transaction information is within an acceptable deviation from the performance information or is associated with an outlier database transaction beyond the acceptable deviation from the performance information;
   when the transaction information associated with the database transaction is within an acceptable deviation from the performance information, add the transaction information to an aggregated record of conforming database transactions that is cached in a local memory and, in response to determining that the number of conforming database transactions stored in the aggregated record exceeds a threshold quantity of transactions, externalizing the aggregated record of conforming database transactions by transferring the aggregated record into an external data store; and when the transaction information is associated with an outlier database transaction, generating an individual record for the outlier database transaction, the individual record comprising resource usage information associated with the outlier database transaction, wherein conditions for determining the outlier database transaction are dynamically adjusted based on a configuration parameter indicating the acceptable deviation from the performance information.

2. The computer-implemented method of claim 1, wherein the database transaction is associated with an identifier that is based on the transaction information and the performance information is accumulated based on each transaction information associated with the identifier.

3. The computer-implemented method of claim 1, wherein the database transaction is directed to one or more database servers within a cloud environment.

4. The computer-implemented method of claim 1, wherein the performance information includes average values for one or more performance metrics and deviation values for the performance metrics.

5. The computer-implemented method of claim 4, wherein the deviation values include one of a standard deviation and an average difference between the transaction information associated with the database transaction and current average values for the one or more performance metrics.

6. The computer-implemented method of claim 2, wherein the aggregated record comprises transaction information that is separately aggregated for one or more database transactions associated with each of the identifiers.

7. The computer-implemented method of claim 1, wherein the performance information is updated dynamically.

* * * * *